Patented Dec. 17, 1940

UNITED STATES PATENT OFFICE 2,225,384

PRINTING COLORS AND PROCESS OF PRINTING

Charles Graenacher, Riehen, and Max Matter, Basel, Switzerland, assignors to the firm Society of Chemical Industry in Basle, Basel, Switzerland No Drawing. Application June 20, 1939, Serial No. 280,214. In Switzerland June 22, 1938

7 Claims. (Cl. 8—62)

It has been found that textile materials, for example vegetable and animal fibers (cotton, artificial silk from regenerated cellulose, wool and silk) can be printed with water-soluble acyl derivatives of sparingly soluble dyestuffs containing the group determining the water solubility of the product in the acyl radical, when using in the printing water-soluble hydantoin compounds, i. e. hydantoins of the general formula

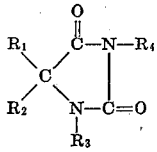

wherein $R_1$ and $R_2$ represent hydrogen or alkyl radicals which may contain substituents, $R_3$ and $R_4$ represent hydrogen, acyl groups of low molecular weight or alkyl groups which may be substituted.

Acyl derivatives of sparingly soluble dyestuffs of the above kind and their application are described for example in applications Serial No. 92,244 filed July 23, 1936 (now U. S. Patent No. 2,170,262), and No. 173,528, filed November 8, 1937, further in Patents No. 2,120,741 and No. No. 2,095,600. The application of these dyestuffs is also described in applications Serial No. 217,633, filed July 5, 1938 (now U. S. Patent No. 2,187,453), No. 261,841, filed March 14, 1939, and No. 261,842, filed March 14, 1939.

Water-soluble hydantoins of the general formula

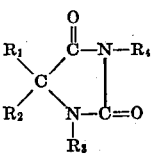

wherein $R_1$, $R_2$, $R_3$ and $R_4$ have the indicated significance, are mostly known products or may be produced according to known analogous processes. Such products are for example hydantoin, 5-methyl-hydantoin, 5-ethyl-hydantoin, 5:5-dimethyl-hydantoin, 5-propyl-hydantoin, 5-isopropyl-hydantoin, 5-methyl-5-ethyl-hydantoin, 5:5-methyl-propyl-hydantoin, 1-methyl-hydantoin, 3-methyl-hydantoin, 3-ethyl-hydantoin, 3-allyl-hydantoin, 1- (or 3-)-hydroxymethyl-hydantoin, 3-hydroxyethyl-hydantoin, 1-acetyl-hydantoin, 3-methyl-1-acetyl-hydantoin and hydantoin-acetamide.

The water-soluble hydantoins used according to the present process may be added for example to the printing pastes. They may also be mixed with powdered water-soluble acyl derivatives whereby powders are obtained which are suitable for use in printing. It may be appropriate in many cases to use also other hydrotropic additions suitable in printing besides the cited hydantoins, for instance urea, thiourea, alkylthio-glycollic acid amides, water-soluble salts of benzylaniline- or cymene sulfonic acid, water-soluble salts of substituted aromatic carboxylic acids or of dicarboxylic acid semi-esters, further water-soluble alcohols, for instance glycerine, ethylene glycol or thiodiglycol. The mixtures consisting of the water-soluble hydantoins and the hydrotropic agents, especially urea, may be added both to the printing pastes and to the powdered water-soluble dyestuff derivatives.

The present process may be used in all kinds of textile printing, for example in discharge printing or direct printing, for instance on fabrics or yarns; the prints are developed according to the known processes mentioned at the beginning of this specification.

The prints obtainable according to the present invention are generally of deeper color than the prints obtained with the same quantity of dyestuff, but without use of the water-soluble hydantoins. The unexpected property of increasing the proportion of affinity between fiber and dyestuff in many cases is probably to be attributed to swelling processes. It is often possible to increase the purity or the fastness of the prints when working according to the present process.

The water-soluble hydantoins to be used according to the present process have the advantage of representing generally odorless, solid products which can be mixed offhand with dyestuff derivatives which may be used.

The following examples illustrate the invention:

Example 1

A printing color of the following constitution is prepared:

| | Grams |
|---|---|
| The product of the action of benzoylchloride-meta-sulfonic acid on the azo-dyestuff from diazotized 3-chloraniline and 2:3-hydroxynaphthoic acid-ortho-anisidide | 80 |
| 5:5-dimethylhydantoin | 140 |
| Water | 320 |
| Starch tragacanth thickening | 460 |

This paste is printed on a fabric consisting of cotton, artificial silk from regenerated cellulose, natural silk, wool or of a mixture of two or more of these materials. The printed fabric is dried, steamed for 4–8 minutes in a Mather-Platt apparatus and drawn for 4–6 minutes at room temperature through a solution containing 1.2 per cent of sodium hydroxide, 1.5–2 per cent of barium chloride and 5 per cent of sodium chloride. It is then rinsed, acidified, again rinsed and soaped at the boil. A fast orange print is thus obtained.

Instead of 140 grams of 5:5-dimethylhydantoin there may also be used 140 grams of a concentrated solution of 3-methylol-5:5-dimethylhydantoin, obtained for example from 128 parts of 5:5-dimethylhydantoin and 81 parts of a feebly phenolphthaleinalkaline formaldehyde solution of 37 per cent strength by shortly heating to 60° C.

*Example 2*

A printing color of the following constitution is prepared:

| | Grams |
|---|---|
| The product of the action of benzoic acid-meta-sulfochloride on the azo-dyestuff from diazotized 2:5-dichloraniline and 2:3-hydroxynaphthoic acid-ortho-anisidide | 80 |
| 5:5-dimethylhydantoin | 60 |
| Urea | 120 |
| Water | 240 |
| Starch tragacanth thickening | 500 |

This paste is printed on a fabric of the kind indicated in Example 1, the printed fabric is dried, steamed and developed as described in Example 1. There are obtained fast prints of vivid scarlet red color.

Instead of 5:5-dimethylhydantoin there may also be used 5-methyl-5-ethylhydantoin. Instead of the above mentioned reaction product of benzoic acid-sulfo-sulfochloride there may also be used the corresponding reaction product of benzoic acid-3:5-disulfochloride.

Further it is possible to use the reaction product obtainable from the above mentioned dyestuff from diazotized 2:5-dichloraniline and 2:3-hydroxynaphthoic acid-ortho-anisidide with aid of 4-chloromethyl-benzoylchloride in pyridine solution.

*Example 3*

A printing color of the following constitution is prepared:

| | Grams |
|---|---|
| The product of the action of benzoylchloride sulfonic acid on the condensation product from 1 mol of cyanuric chloride, 2 mols of 2-aminoanthraquinone and 1 mol of aniline | 60 |
| 3:5:5-trimethylhydantoin | 70 |
| Urea | 135 |
| Water | 250 |
| Starch tragacanth thickening | 485 |

This paste is printed on a fabric of the kind indicated in Example 1, the printed fabric is dried, steamed and developed as described in Example 1. There are obtained fast yellow prints.

*Example 4*

A printing color of the following constitution is prepared:

| | Grams |
|---|---|
| The product of the action of benzoylchloride sulfonic acid on the azo-dyestuff from diazotized 1-amino-2-methyl-4-chlorobenzene and 2:3-hydroxynaphthoic acid-2'-methyl-4'-chloranilide | 80 |
| 1-acetyl-5:5-dimethylhydantoin | 80 |
| Urea | 120 |
| Water | 240 |
| Starch tragacanth thickening | 480 |

This paste is printed on a fabric of the kind indicated in Example 1, the printed fabric is dried, steamed and developed as described in Example 1. There are obtained fast red tints.

Instead of the above mentioned product of the reaction there may be used in similar manner the products of the action of benzoylchloride sulfonic acid on the azo-dyestuffs from 2:3-hydroxynaphthoic acid-$\alpha$-naphthylamide or from 2:3-hydroxynaphthoic acid-$\beta$-naphthylamide and from diazotized aromatic amines, such as 1-amino-2-methyl-4-chlorobenzene.

*Example 5*

A printing color of the following constitution is prepared:

| | Grams |
|---|---|
| The product of the action of benzoylchloride sulfonic acid on the azo-dyestuff from diazotized 2:5-diethoxy-4-benzoylamino-aniline and 2:3-hydroxynaphthoic acid anilide | 50 |
| 5-methyl-5-propylhydantoin | 20 |
| 5-methyl-5-ethylhydantoin | 25 |
| 5:5-dimethylhydantoin | 25 |
| Urea | 120 |
| Water | 260 |
| Starch tragacanth thickening | 500 |

The paste is printed on a fabric of the kind indicated in Example 1, the printed fabric is dried, steamed and developed as described in Example 1. There are obtained fast blue prints.

Instead of 5-methyl-5-propylhydantoin there may also be used 3-hydroxyethyl-5:5-dimethylhydantoin. This is obtained by the action of ethylene chlorohydrin on the mono-sodium salt of 5:5-dimethylhydantoin in an aqueous solution of 80–100° C.

*Example 6*

A printing color of the following constitution is prepared:

| | Grams |
|---|---|
| The product of the action of benzoic acid-3:5-disulfochloride on the azo-dyestuff from diazotized $\alpha$-naphthylamine and $\beta$-naphthol | 80 |
| 5:5-dimethyl-hydantoin | 60 |
| Urea | 120 |
| Water | 240 |
| Starch tragacanth thickening | 480 |

This paste is printed on a fabric of the kind indicated in Example 1, the printed fabric is dried, steamed and developed as described in Example 1. There are obtained fast Bordeaux red prints.

A violet-brown print may be produced in similar manner with the corresponding product of the action on the azo-dyestuff from tetrazotized 4:4'-diamino-diphenyl and $\beta$-naphthol.

*Example 7*

A printing color of the following constitution is prepared:

| | Grams |
|---|---|
| The product of the action of 4-chloromethyl-benzoyl-chloride on the azo-dyestuff from diazotized ortho-nitraniline and $\beta$-naphthol, prepared in pyridine solution | 80 |
| 5:5-dimethyl-hydantoin | 60 |
| Urea | 120 |
| Water | 240 |
| Starch tragacanth thickening | 480 |

This paste is printed on a fabric of the kind indicated in Example 1, the printed fabric is dried, steamed and developed as described in Example 1. There are obtained fast orange prints.

What we claim is:

1. Printing colors, suitable for printing vegetable and animal fibers, which contain such a water-soluble acyl derivative of a difficultly soluble dyestuff selected from the group consisting of azo and anthraquinone dyestuffs which contains the water-solubilizing group in the acyl radical, and also contains a printing assistant comprising a member of the group consisting of water-soluble hydantoin compounds of the general formula

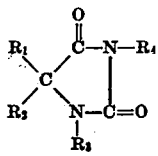

wherein $R_1$ and $R_2$ represent a member of the group consisting of hydrogen, alkyl radicals and substituted alkyl radicals, $R_3$ and $R_4$ represent a member of the group consisting of hydrogen, acyl groups of low molecular weight, alkyl groups and substituted alkyl groups.

2. Printing colors, suitable for printing vegetable and animal fibers, which contain such a water-soluble acyl derivative of a difficultly soluble dyestuff selected from the group consisting of azo and anthraquinone dyestuffs which contains the water-solubilizing group in the acyl radical, and also contains a printing assistant comprising a water-soluble alkyl substituted hydantoin compound.

3. Printing colors, suitable for printing vegetable and animal fibers, which contain such a water-soluble acyl derivative of a difficultly soluble dyestuff selected from the group consisting of azo and anthraquinone dyestuffs which contains the water-solubilizing group in the acyl radical, and also contains a printing assistant comprising a water-soluble alkyl substituted hydantoin compound and urea.

4. Printing colors, suitable for printing vegetable and animal fibers, which contain such a water-soluble acyl derivative of a difficultly soluble dyestuff selected from the group consisting of azo and anthraquinone dyestuffs which contains the water-solubilizing group in the acyl radical, and also contains a printing assistant comprising 5:5-dimethyl-hydantoin and urea.

5. Printing colors, suitable for printing vegetable and animal fibers, which contain a water-soluble acyl derivative obtained from a halide of a benzoic sulfonic acid and a water-insoluble azo-dyestuff from an arylide of the 2:3-hydroxy-naphthoic acid and a diazotized amine, and also contains a printing assistant comprising 5:5-dimethyl-hydantoin and urea.

6. Printing colors, suitable for printing vegetable and animal fibers, which contain such a water-soluble acyl derivative of a difficultly soluble dyestuff selected from the group consisting of azo and anthraquinone dyestuffs which contains the water-solubilizing group in the acyl radical, and also contains a printing assistant comprising 5-methyl-5-ethyl-hydantoin and urea.

7. Printing colors, suitable for printing vegetable and animal fibers, which contain a water-soluble acyl derivative obtained from a halide of a benzoic sulfonic acid and a water-insoluble azo-dyestuff from an arylide of the 2:3-hydroxy-naphthoic acid and a diazotized amine, and also contains a printing assistant comprising 5-methyl-5-ethyl-hydantoin and urea.

CHARLES GRAENACHER.
MAX MATTER.